United States Patent
Krolski et al.

(10) Patent No.: US 10,710,824 B2
(45) Date of Patent: Jul. 14, 2020

(54) CURBED RAMP

(71) Applicant: Discount Ramps.com, LLC, West Bend, WI (US)

(72) Inventors: Robert Krolski, Kewaskum, WI (US); Richard Beilstein, West Bend, WI (US); Lawrence Marmon, Milwaukee, WI (US)

(73) Assignee: Discount Ramps.com LLC, Germantown, WI (US)

( * ) Notice: Subject to any disclaimer, the term of this patent is extended or adjusted under 35 U.S.C. 154(b) by 0 days.

(21) Appl. No.: 15/891,856

(22) Filed: Feb. 8, 2018

(65) Prior Publication Data

US 2018/0229951 A1    Aug. 16, 2018

Related U.S. Application Data (60) Provisional application No. 62/457,570, filed on Feb. 10, 2017.

(51) Int. Cl.
*E01D 1/00* (2006.01)
*B65G 69/30* (2006.01)
*E04F 11/00* (2006.01)

(52) U.S. Cl.
CPC ............ *B65G 69/30* (2013.01); *E04F 11/002* (2013.01); *E04F 2011/007* (2013.01)

(58) Field of Classification Search
CPC ... B65G 69/30; E04F 11/002; E04F 2011/007
USPC ....... 14/69.5; D34/32; D30/119; 256/59, 63, 256/64, 66; 187/200
See application file for complete search history.

(56) References Cited

U.S. PATENT DOCUMENTS

| | | | | |
|---|---|---|---|---|
| 3,517,791 A | * | 6/1970 | Miles | B60P 1/43 14/69.5 |
| 3,691,576 A | * | 9/1972 | Miles | B65G 69/30 14/72.5 |
| 3,984,891 A | * | 10/1976 | Weinmann | B65G 69/30 14/69.5 |
| 4,723,758 A | * | 2/1988 | Gehrig | E01F 9/669 256/1 |
| 4,912,796 A | * | 4/1990 | Crump | A61G 3/061 14/69.5 |
| 5,277,436 A | * | 1/1994 | Frank | B62B 5/04 14/69.5 |
| 6,267,082 B1 | * | 7/2001 | Naragon | A01K 1/035 119/849 |
| 6,345,950 B1 | * | 2/2002 | Gerwitz | B65G 11/143 414/537 |

(Continued)

*Primary Examiner* — Thomas B Will
*Assistant Examiner* — Katherine J Chu
(74) *Attorney, Agent, or Firm* — Andrus Intellectual Property Law, LLP (57) ABSTRACT

A ramp system includes a rail with an outer wall that defines an extent of the ramp in a width dimension. The rail includes an inner wall that is connected to the outer wall at a curb head. The inner wall extends away from the curb head at an angle relative to the outer wall. A side wall is oriented parallel to the outer wall. A lower end of the side wall is connected to a lower end of the outer wall by a bottom wall. A shelf is connected between an upper end of the side wall and a lower end of the inner wall. The shelf extension is connected between the lower end of the inner wall and the outer wall. A deck is secured to the shelf.

16 Claims, 6 Drawing Sheets

(56) References Cited

U.S. PATENT DOCUMENTS

| | | | | |
|---|---|---|---|---|
| 6,389,629 B1* | 5/2002 | Schouest | B60P 1/43 | |
| | | | 119/849 | |
| 6,430,769 B1* | 8/2002 | Allen | A61G 3/061 | |
| | | | 14/69.5 | |
| 6,533,251 B1* | 3/2003 | Abbaticchio | E04F 11/1804 | |
| | | | 256/59 | |
| 6,874,766 B2* | 4/2005 | Curatolo | E04F 11/1817 | |
| | | | 256/59 | |
| 7,104,524 B1* | 9/2006 | Hidding | B66F 7/243 | |
| | | | 14/69.5 | |
| 7,179,042 B1* | 2/2007 | Hartmann | B65G 69/30 | |
| | | | 14/69.5 | |
| 7,299,517 B1* | 11/2007 | Adinolfe | B65G 69/30 | |
| | | | 14/69.5 | |
| 7,302,725 B2* | 12/2007 | Thygesen | B60P 1/43 | |
| | | | 14/69.5 | |
| 7,607,186 B1* | 10/2009 | Mitchell | E04F 11/002 | |
| | | | 14/69.5 | |
| 7,694,375 B2* | 4/2010 | Twedt | B65F 3/00 | |
| | | | 14/69.5 | |
| 7,930,788 B1* | 4/2011 | Beilstein | B65G 69/30 | |
| | | | 14/69.5 | |
| 8,347,439 B1* | 1/2013 | Beilstein | B65G 69/30 | |
| | | | 14/69.5 | |
| 8,448,278 B1* | 5/2013 | Beilstein | B65G 69/30 | |
| | | | 14/69.5 | |
| 8,534,952 B2* | 9/2013 | Vladislavic | E01F 15/0423 | |
| | | | 256/13.1 | |
| 8,813,289 B1* | 8/2014 | Clark | E04F 11/002 | |
| | | | 14/69.5 | |
| 10,029,742 B2* | 7/2018 | Evans | E05D 5/0238 | |
| 2002/0098071 A1* | 7/2002 | Henderson | B60P 1/435 | |
| | | | 414/537 | |
| 2003/0182740 A1* | 10/2003 | Schmaltz | A61G 3/061 | |
| | | | 14/69.5 | |
| 2004/0111814 A1* | 6/2004 | Allen | B65G 69/30 | |
| | | | 14/69.5 | |
| 2005/0051762 A1* | 3/2005 | Giralt | E04F 11/181 | |
| | | | 256/59 | |
| 2008/0142772 A1* | 6/2008 | Amendola | E04H 17/1417 | |
| | | | 256/64 | |
| 2008/0179580 A1* | 7/2008 | McGinness | E04H 17/16 | |
| | | | 256/59 | |
| 2009/0016865 A1* | 1/2009 | Astor | B65G 69/30 | |
| | | | 414/430 | |
| 2015/0013081 A1* | 1/2015 | Breeden, III | B65G 69/30 | |
| | | | 14/69.5 | |

* cited by examiner

CURBED RAMP

CROSS-REFERENCE TO RELATED APPLICATION

The present application claims priority of U.S. Provisional Patent Application No. 62/457,570, filed on Feb. 10, 2017, the content of which is hereby incorporated herein by reference in its entirety.

BACKGROUND

Personal and/or recreational vehicles and various types of cargo are often transported in the bed of a trailer, truck, or van. Often, such trailer, truck, or van beds are used for many purposes and therefore integrated ramps systems are often to complex or expensive. Therefore, removable ramps provide economical solution to raise vehicles and/or cargo from the ground onto the height of the transport vehicle bed. These solutions are particularly suited for loading of work or recreational vehicles, for example ATVs, snowmobiles, motorcycles, riding lawn mower or lawn tractors, Bobcats, or forklifts. It will be recognized that other types of vehicles may be transported a well, including, but not limited to golf carts or cars.

While it may be desirable to provide a side lip on the opposed lateral edges of a ramp, ramp loading solutions that effectively provide such a lip in a durable and effective manner have been elusive to the industry. Ramp lips of low profile serve little restraining function and do little to retain wheel of a vehicle on the ramp. However, as the lip extends in height, the lip itself becomes fragile and susceptible to breaking under impact from the object to be transported. Breaking or failure of such a lip effectively defeats the purpose as it would not retain the object to be transported on the ramp. Additionally, embodiments of lips welded to the exterior of the ramp result in a welding seam precisely at the potential point of failure of the lip, for example due to the heat affected zone surrounding the weld, and places a manufacturing blemish from the weld itself which impairs the ability to position reflective tape or coatings along the side of the ramp, precisely at the level of the ramp deck, which may be particularly desirable. Therefore, new ramp solutions that provide for effective ramp curb in ramp section modules in a modular ramp construction are desirable in the field and unmet by currently available ramp solutions.

Exemplary embodiments of modular ramp solutions and exemplary uses thereof are disclosed in at least the following patent references: U.S. Pat. Nos. 7,299,517; 7,930,788; 8,061,943; 8,347,493; 8,448,278; and 8,640,826; all of which are herein incorporated by reference in their entireties.

BRIEF DISCLOSURE

An exemplary embodiment of a ramp system includes a beam oriented along a major length of the ramp system. The rail is oriented along the major length of the ramp system. The rail includes an outer wall that defines an extent of the ramp in a width dimension. The rail includes an inner wall that is connected to the outer wall at a curb head. The inner wall extends away from the curb head at an angle relative to the outer wall. A side wall is oriented parallel to the outer wall. A lower end of the side wall is connected to a lower end of the outer wall by a bottom wall. A shelf is connected between an upper end of the side wall and a lower end of the inner wall. The shelf extension is connected between the lower end of the inner wall and the outer wall. A deck is secured to the shelf of the rail and to the beam. The deck is configured to support a wheel of a vehicle.

In an exemplary embodiment of the ramp system a curb includes the inner wall, the shelf extension, and an upper portion of the outer wall from the shelf extension to the curb head. A vertical extent of the upper portion of the outer wall is greater than half of the vertical extent of the outer wall. Still further exemplary embodiments of the ramp system may include additional features. The angle of the inner wall may be 10° or less. The shelf and the shelf extension may be equal widths in a horizontal dimension. The shelf extension may be perpendicular to the side wall. The curb head exemplarily forms an arch between the outer wall and the inner wall.

In still further exemplary embodiments of the ramp system, the rail is a first rail and the curb of the first rail is a first curb. The ramp system may include a second rail with a second curb and a second shelf. The deck is secured to the second shelf and the first rail defines an outer extent of a first side of the ramp system and the second rail defines an outer extent of a second side of the ramp system.

In still further exemplary embodiments of the ramp system, the beam, the rail, and the deck define a first ramp and the beam is a first beam, the rail is a first rail, and the deck is a first deck. The ramp system may further include a second ramp that includes a second beam, a second rail, and a second deck. In exemplary embodiments, the first ramp and the second ramp are oriented with the first rail parallel to the second rail and the first deck adjacent to the second deck in a width dimension of the ramp system. In another exemplary embodiment, the first ramp and the second ramp are connected to a ramp stand and the first deck is adjacent to the second deck in a length dimension of the ramp system.

In a still further exemplary embodiment of a ramp system, a foot pad includes a deck plate and a base plate. The base plate is longer in a length dimension than the deck plate and the deck plate is oriented at an angle relative to the base plate. The foot pad includes a channel that is configured to receive a ramp hook secured to the rail and the beam to movably and removably secure the ramp hook in the channel.

DETAILED DISCLOSURE

Figure 1:
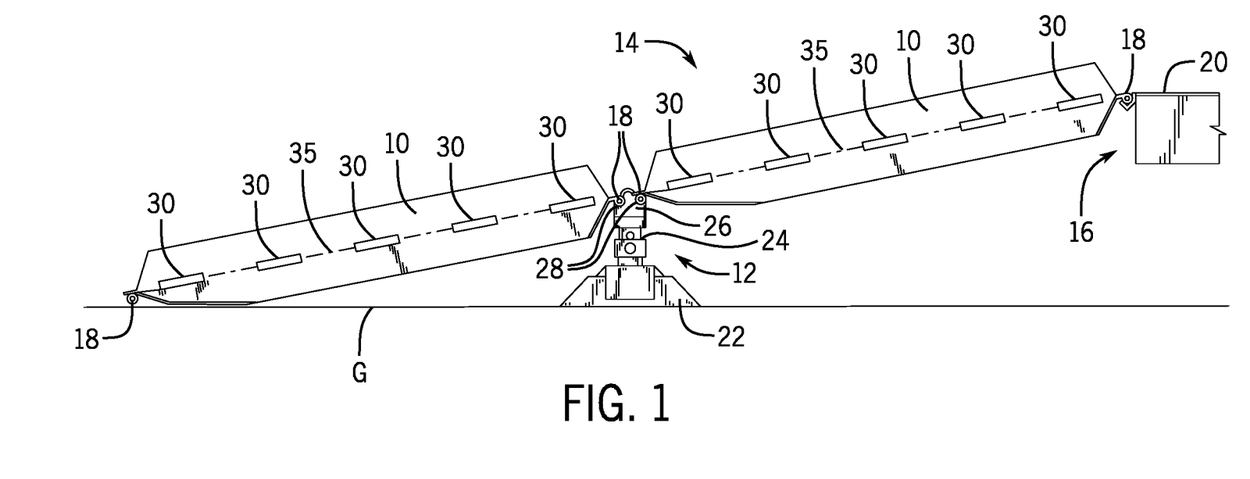
FIG. 1 is a side view of an exemplary embodiment of a ramp system.
Figure 2:
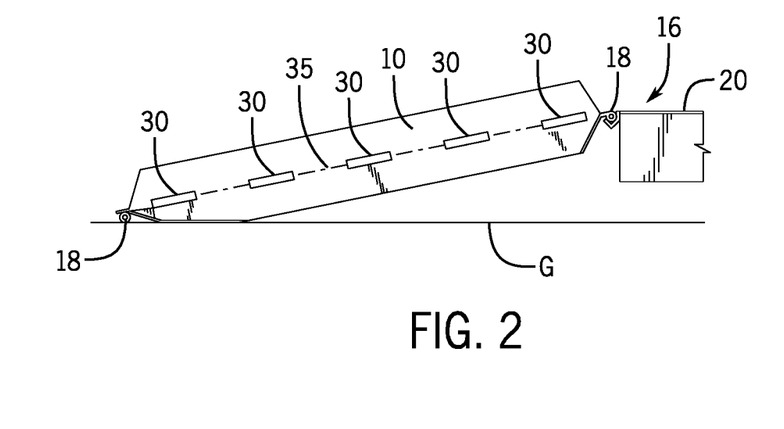
FIG. 2 is a side view of an exemplary embodiment of a ramp.

FIGS. 1 and 2 depict exemplary embodiments of ramps 10 as disclosed in further detail herein. In FIG. 1, two ramps are depicted in combination with a ramp stand 12 in an exemplary embodiment of a ramp system 14 to provide an inclined transportation path between the ground G and a bed 16 of a vehicle. The vehicle may exemplarily be a truck, a trailer, or a van, but is by no means limited thereto. In still further exemplary embodiments, the ramp 10 may be used to move a vehicle or an object from one stationary surface to another stationary surface.

The ramp 10 includes two ends, each end exemplarily terminating in a hook 18. The hook 18 exemplarily takes the form of a tube. In exemplary embodiments, the bed 16 is configured with a skid seat 20 that is configured to removably retain a hook 18 of the ramp 10 to the bed 16. In the case of the ramp stand 12, the ramp stand includes a base 22 and at least one vertical adjustment member 24. The ramp stand 12 further includes a cross member 26 that includes two grooves 28 configured to respectively receive the hooks 18 of respective ramps 10.

The ramps 10 further exemplarily include reflectors 30. Each ramp 10 may exemplarily include one or more reflectors 30 located on an outside of a rail 32 of the ramp 10. Exemplarily, the reflector 30 may be constructed of metal or plastic and secured to the rail 32 in a variety of known securement means, including, but not limited to adhesives. In still further exemplary embodiments, the reflectors 30 may be stickers, paint, or another reflective surface treatment as may be known to a person of ordinary skill in the art.

In exemplary embodiments, the reflectors 30 are positioned such as to extend on both sides of a respective center line 35 of the rail 32 in the vertical dimension. In still further exemplary embodiments, the reflector 30 may be positioned entirely below the center line 35 or entirely above the center line 35. In still further exemplary embodiments, the reflectors 30 may be positioned relative to an upper surface of a deck of the ramp as will be described in further detail herein. Such positioning relative to the deck surface may be in alignment with the deck surface, above the deck surface, or below the deck surface.

Figure 3:
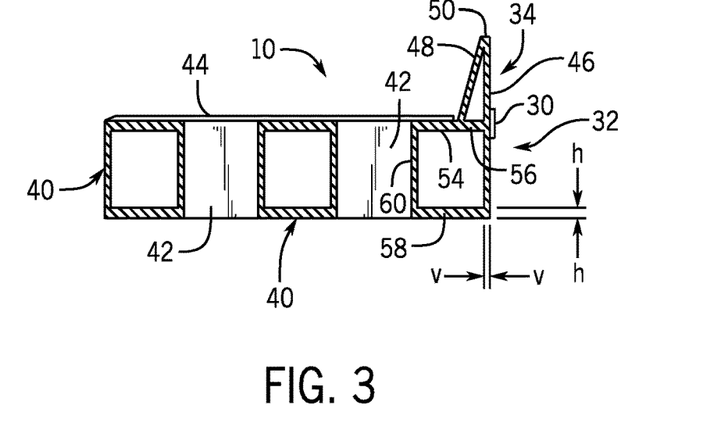
FIG. 3 is a cross sectional view of an exemplary embodiment of a ramp taken along line 3-3 of FIG. 4.
Figure 4:
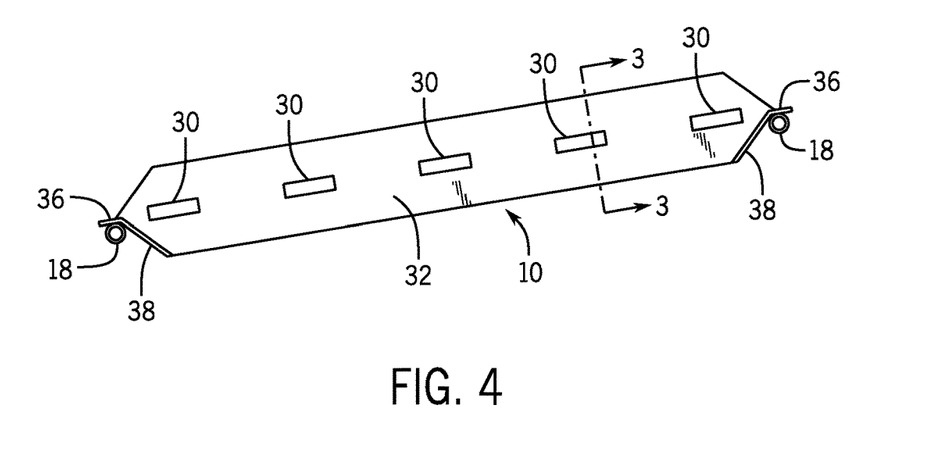
FIG. 4 is a side view of an exemplary embodiment of a ramp.
Figure 5:
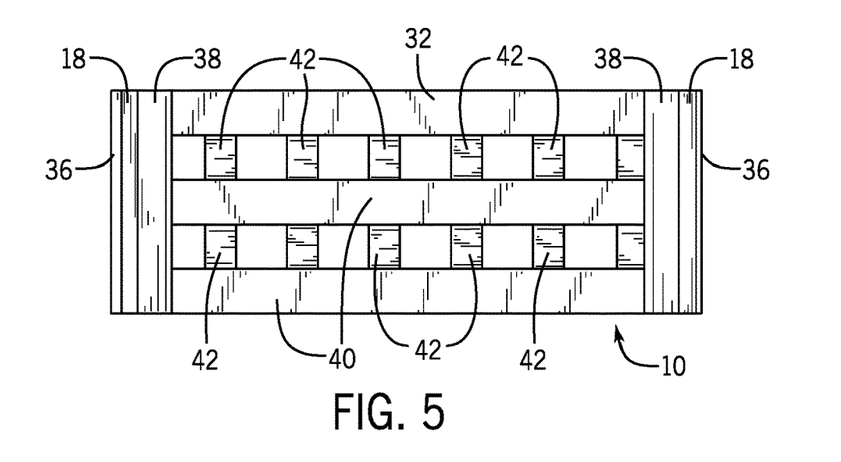
FIG. 5 is a bottom view of an exemplary embodiment of a ramp.
Figures 6, 7:
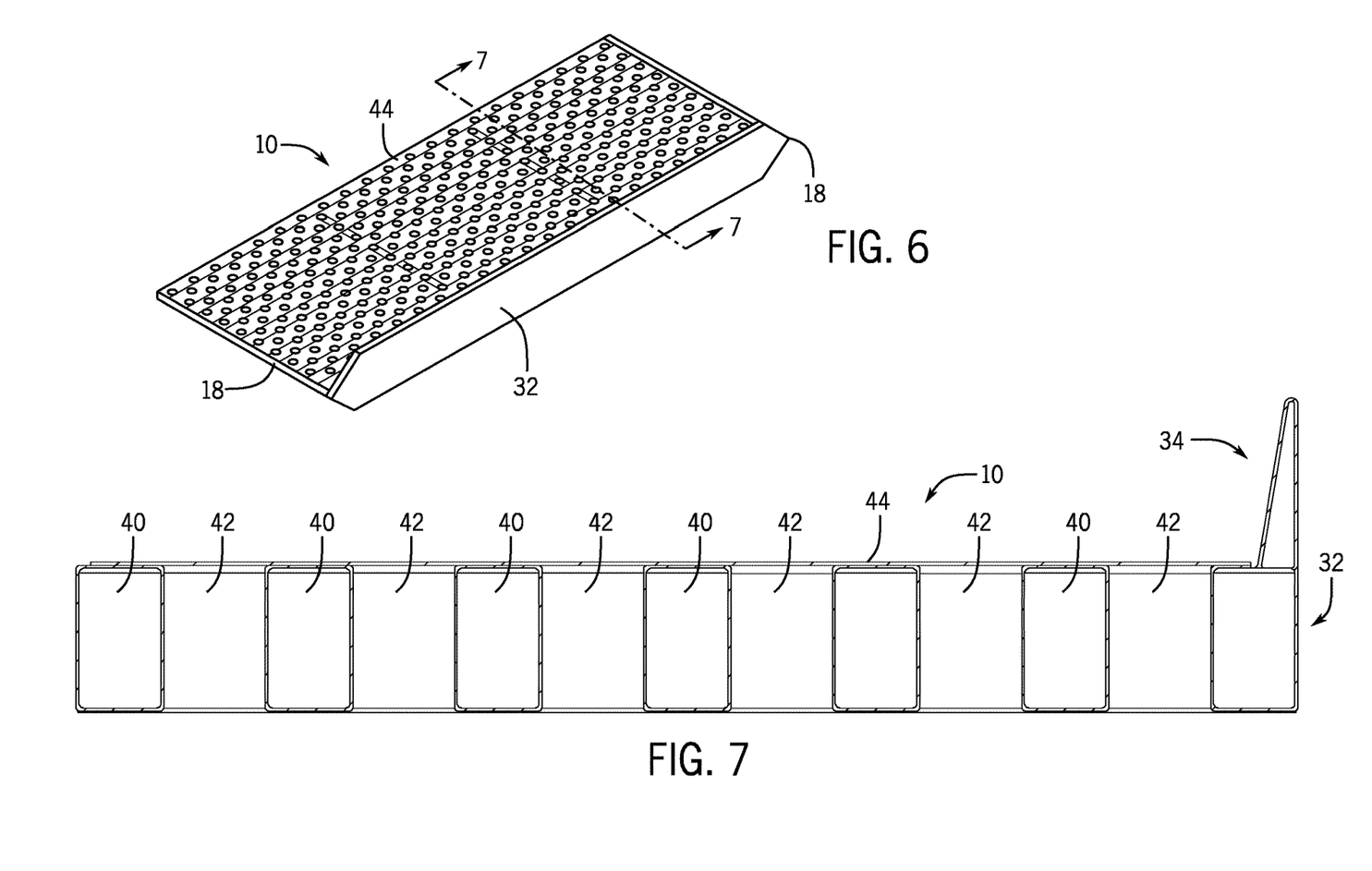
FIG. 6 is perspective view of an exemplary embodiment of a ramp.
FIG. 7 is a sectional view exemplarily taken along line 7-7 of FIG. 6.
Figure 8:
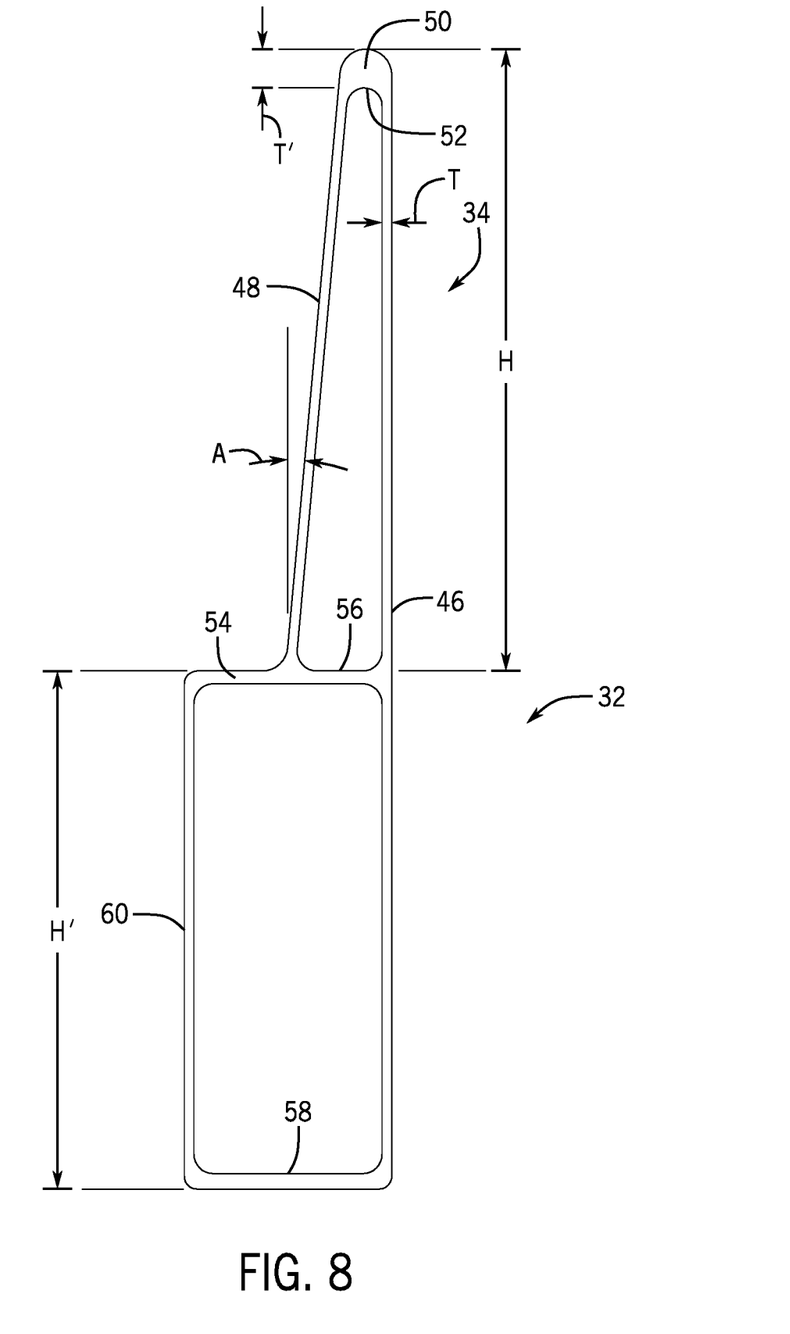
FIG. 8 is a cross sectional view of an exemplary embodiment of a rail.

FIGS. 3-5 and 6-8 respectively depict exemplary embodiments of ramps 10 as presently disclosed herein. It will be recognized that like reference numerals are used between the exemplary embodiments to reference like features. As best seen in FIGS. 3, 7, and 8, the ramp 10 includes at least one rail 32 which includes a curb 34. As previously described, currently available solutions fail to provide a curb or a lip on a ramp of sufficient size and strength to effectively retain vehicles and/or objects being transported up the ramp should such vehicle and/or objects come to an engage the edge of the ramp.

Figure 9:
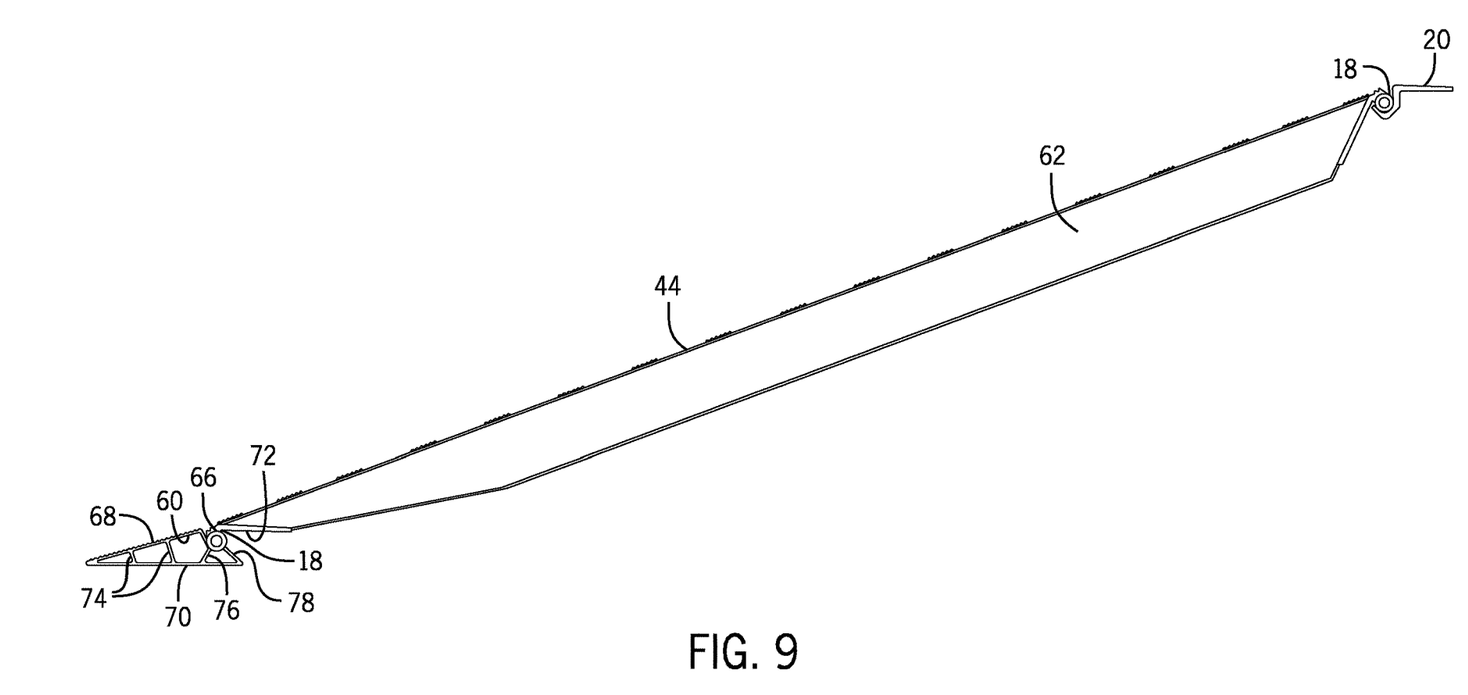
FIG. 9 depicts an exemplary embodiment of a ramp with a foot pad.
Figure 10:
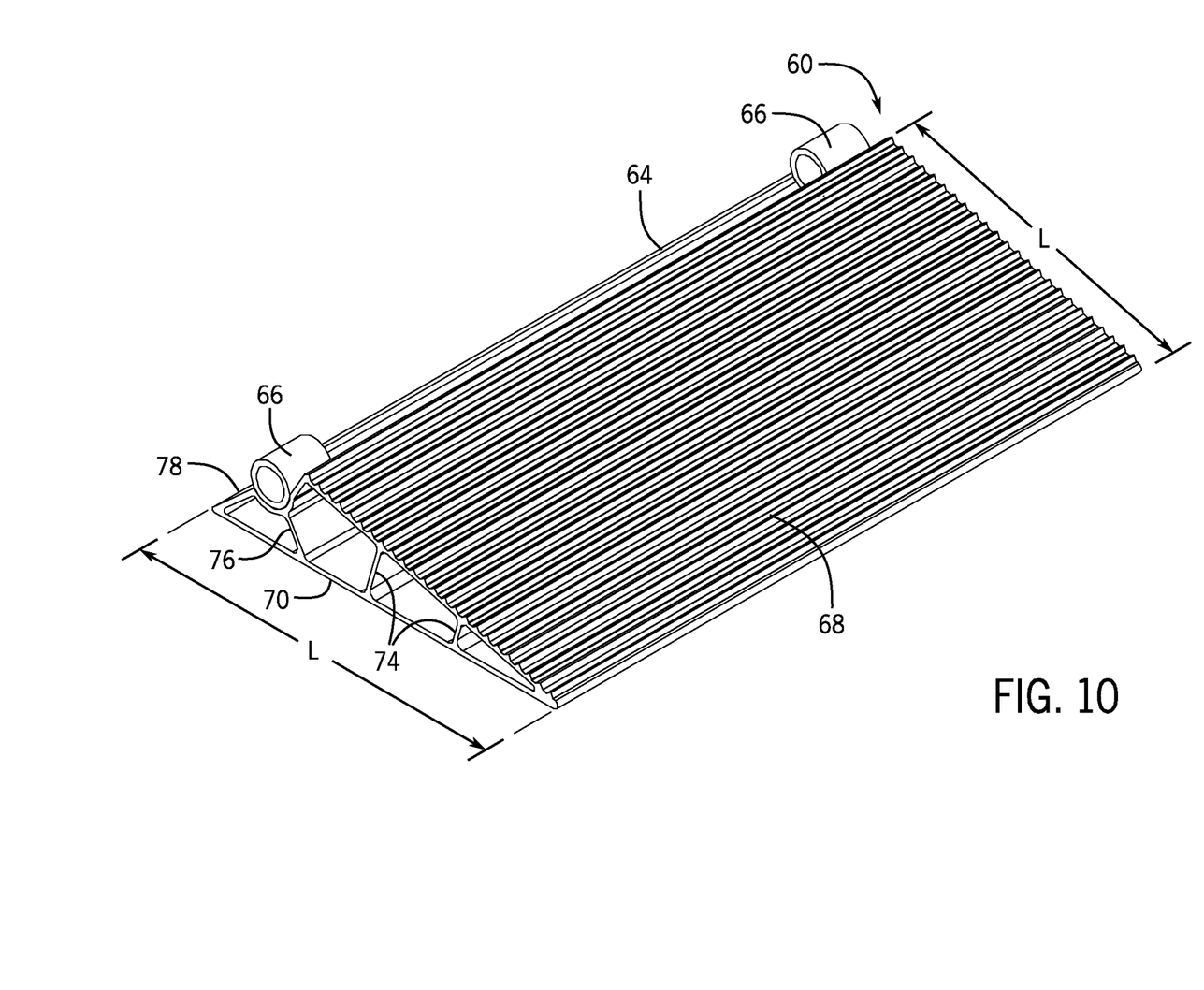
FIG. 10 is a perspective view of an exemplary embodiment of a foot pad.

The ramp 10 exemplarily includes a hook 18 at either end, the hook 18 may be secured to an end flange 36 of an end plate 38 secured across the respective ends of the ramp 10. The ramp 10 exemplarily includes at least one rail 32 which extends along the length of the ramp 10. The ramp 10 further includes at least one, and in exemplary embodiments a plurality of beams 40 which also extends the length of the ramp 10. A plurality of supports 42 are secured between adjacent beams 40 and between the at least one rail 32 and an adjacent beam 40. In an exemplary embodiment, the supports 42 are oriented perpendicularly to the beams 40 and the rail 32. A deck 44 is arranged over the beams 40, supports 42, and a portion of the rail 32. The deck 44 is exemplarily secured thereto. In exemplary embodiments, the deck 44 may be a sheet of metal, e.g. aluminum. The deck 44 may include traction promoting features, structures, surface treatment, or coating in order to promote traction along the ramp 10. In an exemplary embodiment, the deck 44 may include a plurality of projections or punched structures with upwardly angled or extending features to provide both traction as well as spaces for debris to pass through the ramp. In still further exemplary embodiments, the deck 44 may exemplarily be constructed of a plurality of rungs 60 (as depicted in FIGS. 9 and 10 described in further detail herein) which may otherwise be referred to as cross bars that extend across and are secured to the rail 32 and the beams 40.

FIG. 8 exemplarily depicts a rail 32 as exemplarily used in embodiments of the ramps as disclosed in the present application. While the description provided herein may use some exemplary dimensions, it will be recognized that these dimensions are merely exemplary and that other embodiments and dimensions may be used while remaining within the scope of the present disclosure. In some exemplary embodiments, specific dimensions, for example component thicknesses and tolerances may be determined based upon a particular use for the ramp or an intended load capacity of a specific ramp embodiment. It will be recognized that one way of increasing the load capacity of a ramp may be to increase the amount or thickness of material used while remaining within the same structural design. However, independent of such design considerations, various positional and structural relationships between components as described herein may be used in embodiments to carry out the features of the ramp as described herein.

The rail 32 includes an outer wall 46 that vertically provides an exterior side of the rail 32, and further of the ramps 10 as previously described. The outer wall 46 meets an inner wall 48 at a curb head 50. The curb head 50 is exemplarily curved and provides a diameter at least four times the thickness T of the vertical walls of the rail 32. The curb head 50 further exemplarily extends in the vertical direction T' at least four times the thickness of the vertical walls of the rail 32. In an exemplary embodiment, the curb head 50 includes an interior curve 52 and thus the curb head 50 takes on the form of an arch between the outer wall 46 and the inner wall 48. The inner wall 48 is exemplarily angled in relation to the curb head 50 and the outer wall 46. In an exemplarily embodiment, the inner wall 48 may be oriented at an angle A between 5° and 10° off from vertical, while in a more specific embodiment, the inner wall 48 is angled 5.2° from vertical.

The rail 32 further includes a shelf 54. The shelf 54 is exemplarily the portion of the rail to which the deck 44 is engaged and supported by the rail 32. The deck 44 is secured to the shelf 54 and this is exemplarily depicted in FIG. 3. The inner wall 48 extends from the curb head 50 to the shelf 54 and connects thereto. A shelf extension 56 extends between the inner section of the shelf 54 and the inner wall 48 to the outer wall 46 to provide strength and rigidity between the inner wall 48 and the outer wall 46. In this manner, the inner wall 48, the shelf extension 56, and a portion of the outer wall 46 form a triangle. The shelf extension 56 is exemplarily perpendicular to the outer wall 46, therefore the triangle formed by the inner wall 48, the shelf extension 56, and a portion of the outer wall 46 is exemplarily a right triangle. In an exemplary embodiment, the shelf 54 is the same length as the shelf extension 56, therefore the inner wall 46 bisects the combined length of the shelf 54 and the shelf extension 56.

In exemplary embodiments, the curb 34 may extend in a vertical dimension above the shelf, or above a combined height of the shelf 54 and the deck 44, a greater distance than the side wall 60, therefore, the curb 34 provides more than half of the entire height of the rail 32. This is exemplarily depicted in FIG. 8 wherein the height of the curb 34, represented by distance H is greater than the height of the side wall 60 represented by distance H'. Embodiments of the rail 32 as provided and described in the present application, enable a rail 32 with a curb 34 that comprises more than half of the total height of the rail while providing the strength needed to resist impact from vehicles transported with embodiments of the modular ramp 10.

A bottom wall 58 and a side wall 60 complete the structure of the rail 32 and exemplarily provides a right angle connection by way of the connected bottom wall 58 and side wall 60 between the shelf 54 and a lower end of the outer wall 46. In this manner, the curb 34 formed exemplarily of an upper portion of the outer wall 46, the curb head 50 and the inner wall 48 is provided in a manner in which the curb 34 extends a greater distance above the plane of the deck 44 in a manner that is stronger and more resilient to impact and/or failure than in previously available solutions. Since the lower end of the inner wall 48 is secured to both of the side wall 60 (by shelf 54) and to the outer wall 46 (by shelf extension 56), the inner wall 48 is constrained from movement or deflection in both the horizontal dimension and in the vertical dimension. This creates a curb 34 with greater resistance to impact, including deformation, breakage, or deformation from said impact, when a force is applied against the inner wall 48. In use, the curb 34 is most likely to be used to resist impact in this manner to retain vehicle wheels on the deck 44. The rail 32 further operates to increase the strength and resistance to impact of the curb 34, particularly in a curb 34 that exemplarily comprises more than half of the entire height of the rail 32 in that the connection of the lower end of the inner wall 48 to both the side wall 60 and the outer wall 46, by the shelf 54 and the shelf extension 56 respectively, further transfers force from the weight of the vehicle on the deck 44 to the shelf 54 which is exemplarily downwards in a counter clockwise direction (relative to FIG. 8) about the intersection of the inner wall 48, shelf 54, and the shelf extension 56, which same counter-clockwise force resists outward deflection of the inner wall 48, and thus the curb 34. The interconnection between the lower end of the inner wall 48, the shelf 54 and the shelf extension 56 also helps to maintain that point in a fixed location relative to the other components of the rail 32, to further resist deflection, strengthening the rail 32.

In embodiments as described above, the shelf 54, the shelf extension 56, and the deck 44 supported by the shelf 54 define a portion of the outer wall 46 that comprises the curb 34. The outer wall 46 is a continuous piece of material that provides an even or smooth surface that is amenable to the mounting of reflectors 30. The reflectors 30, as described above may be reflective paint, a flexible reflective material with an adhesive backing, or a plastic, metal, or other material reflective structure that is secured to the outer wall 46 with adhesive or with a mounting bracket that is secured by mechanical fasteners or adhesive. Embodiments of the ramps 10 as disclosed herein are exemplarily large in a vertical dimension (e.g. of outer wall 46), particularly compared to other prior art ramps. This is in part due to the curb 34 as disclosed herein. In exemplary embodiments, the vertical height of the outer wall 46 may be eleven inches while other embodiments may be larger or smaller. This increased vertical dimension can increase the need for reflectors 30 to be used for safety purposes to make the ramps 10 more visible.

Due to the size of the outer wall 46, and with the curb 34 comprising a large proportion of the outer wall 46 (e.g. 50% or more of the height of the outer wall 46), the reflectors 30 are used in exemplary embodiments for additional purposes as described herein. In one embodiment, the reflectors 30 are aligned along a center line 35 of the outer wall 46. In these embodiments, the reflectors 30 help to denote the extent of the ramp 10. In another embodiment, the reflectors 30 are exemplarily aligned with the deck 44. In such embodiments, the reflectors 30 help users and observers of the ramp 10 to visualize the actual position of the deck 44 and thus surface provided by the deck 44 and the wheels of the vehicle being moved by the ramp 10. This solves a new problem observed by the inventors as due to the height of the outer wall 46 and the offset relationship between the deck 44 and the height of the outer wall 46 in embodiments disclosed herein, the deck surface may not be intuitively positioned relative to the outer wall 46 when the ramp 10 is viewed from the side. This indication of the position of the deck 44 with the reflectors can help for visualization of the ramp surface between the ground G and the bed 16 (FIG. 1). This feature is facilitated by the even, smooth, or otherwise unobstructed surface presented by the outer wall 46, which in prior art ramps may be obscured by the attachment of a lip plate to an existing ramp, for example by welding or mechanical fasteners.

In an exemplarily embodiment, the rail 32 may be constructed as an extrusion of aluminum and cut to size, and exemplarily to provide the angled ends of the rail 32 as exemplarily depicted in FIGS. 1, 2, and 4. In an exemplarily embodiment, the rail 32 may be exemplarily constructed of 6082 T6 aluminum. Exemplarily 6082 T6 aluminum has a tensile strength of at least 50,000 PSI and a yield strength of at least 47,000 PSI. In another embodiment, the rail 32 may be exemplarily constructed of 6061 T6 aluminum with a tensile strength of 38,000 PSI.

As best depicted in FIGS. 6 and 7, the ramp 10 may include a single rail 32 located to one side. A ramp system may exemplary be constructed of two or more ramps arranged side by side wherein the rails 32 of the respective ramps 10 are arranged to opposite sides of the ramp system such as to provide a double width ramp with a rail and comprising a curb 34 on each side in the manners as described herein. In such embodiments it will be recognized that the interior sides of the ramps 10 may be connected or arranged adjacently so as to form a generally continuous ramp surface in the width dimension. In other embodiments, the ramps 10 may be spaced apart in the width dimension. Typically, the vehicle moved using the ramps 10 will have a defined wheel base and thus the set distance between the wheels will dictate the possible positions of the wheels. With the curbs 34 defining a maximum horizontal position of one wheel (e.g. the left wheel position to the left side), the wheelbase defines the same maximum horizontal position of the other wheel (e.g. the right wheel position to the left side). It will be recognized, that in an exemplary embodiment of a ramp, for example as depicted in FIGS. 3-5, the orientation of the rail 32 and curb 34 along the left-hand or right-hand side of the ramp may be changed by reversing the orientation of the ramp since the two ends of the ramp are symmetrical.

In a still further exemplary embodiment, the double width ramp system as just described may be implemented with a ramp stand 12 as depicted in FIG. 1 to provide a double width ramp that extends a greater height distance off the ground while maintaining a low angle of inclination for ease of moving vehicles or objects up the ramp.

FIGS. 9 and 10 depict exemplary embodiments of a ramp foot pad 60 which may exemplary be used in connection with embodiments of the ramps as disclosed herein, as well as with other ramps as depicted in FIG. 9 and as would be recognized by a person of ordinary skill in the art. The foot pad 60 operates to provide greater surface area in ground contact and a lower angle of inclination, particularly as the vehicle or object is first moved onto the ramp. In still further exemplary embodiments of the depicted ramp pad, the ramp pad may provide improved ramp performance on soft ground as the ramp pad provides a greater surface area, a surface area across which the weight of the ramp and the vehicle or object on the ramp may be dispersed. The foot pad 60 also increases the surface area of the ground engagement which reduces the psi load when the ramp system is used on a surface with psi weight limitations, for example hot asphalt. The ramp 62 exemplarily extends between the foot pad 60 and the skid seat 20, as described above with respect to FIG. 1. The ramp 62 exemplarily includes hooks 18 at either end and which at one end engages the skid seat 20 and at the other end is received within a channel 64 of the foot pad 60. The ends of the channel 64 are bounded by hook loops 66 which laterally engage with and/or laterally define a position of the ramp hook 18 within the channel 64 relative to the foot pad 60. In an exemplary embodiment, the hook loops 66 are similar in shape and construction to the hooks 18 such that a locking rod (not depicted) may be positioned to extend through the hook loops 66 and the hooks 18 to connect the ramp 62 to the foot pad 60.

The foot pad 60 includes a deck plate 68 and a base plate 70. The deck plate 68 is exemplarily ridged or otherwise textured and configured for engagement with the wheels of a vehicle. The foot pad 60 is exemplarily defined by the relationships between the deck plate 68 and the base plate 70. In a first aspect, the base plate 70 is longer in a length dimension L than the deck plate 68 in the length dimension L'. In this manner, given that the two structures have the same width, the base plate 70 provides a greater surface area than the surface area of the deck plate 68. The surface area of the base plate 70 is therefore greater than any of the deck plate 68, the ramp hook 18, or an end cap 72 of the ramp 62. The end cap 72 exemplarily is secured over the end of an exterior rail of the ramp 62, for example the rail 32 as discuss with respect to the embodiments above. This increased surface area better distributes the weight of the ramp and vehicle driven on the ramp, for example when the foot pad 60 is placed on soft or loose ground, for example, mud, sand, gravel, or asphalt.

Secondly, the base plate 70 and the deck plate 68 have a smaller internal angle between them than there is between the deck 44 and the end cap 72 of the ramp 62 to which the foot pad 60 is connected. Therefore, the foot pad creates a shallower initial approach angle relative to the ground than that created by the ramp 62 engaging the ground directly. The shallower initial approach angle improves initial engagement and contact between the vehicle wheels and the ramp pad 60/ramp 62. Use of a ramp pad 60 further shallows the overall angle of the ramp 62 when in use as the lower end of the ramp 62 is held at an elevated position relative to the ground G, compared to use of the ramp 62 without a ramp pad 60.

The ramp pad 60 further includes internal support member 74 which extend between the deck plate 68 and the base plate 70. The internal support members 74 are oriented perpendicularly to the deck plate 68. This promotes strength and support of the deck plate 68 to support and carry the load of the vehicle. It will be recognized that the ramp pad 60 can further include an additional support member 76 that is secured between the channel 64 and the base plate 70. A ramp pad end plate 78 further connects the channel 64 to the end of the base plate that extends in the direction of the ramp 62 beyond the channel 64. The ramp pad end plate 78 forms an obtuse angle with the deck plate 68 relative to the base plate 70. In the embodiment depicted, the ramp pad end plate does not directly connect to the deck plate 68, but instead connects to the channel 64 and extends at an obtuse angle away therefrom. Thus, when in use, the base plate 70 and the ramp pad end plate 78 extend below the ramp 62 supported by the ramp pad 60.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A ramp system comprising:
a rail oriented along a major length of the ramp system, the rail comprising:
an outer wall that extends in a vertical direction and defines an extent of the ramp in a width dimension;
a curb comprising an inner wall connected to the outer wall at a curb head that forms a vertical extent of the rail, wherein the inner wall is angled away from the outer wall in a direction away from the curb head at an angle of ten degrees or less;
a side wall oriented parallel to the outer wall and a lower end of the side wall is connected to a lower end of the outer wall by a bottom wall;
a shelf connected to an upper end of the side wall and a lower end of the inner wall; and
a shelf extension is connected to the lower end of the inner wall and to the outer wall, wherein the shelf extension is co-planar with the shelf and the shelf extension is perpendicular to the outer wall; and
a deck secured to the shelf, the deck configured to support a wheel of a vehicle, the curb vertically extending above the deck;
wherein the curb head is solid through a distance in the vertical direction at least four times a thickness of the outer wall or the inner wall.

2. A ramp system comprising:
a rail oriented along a major length of the ramp system, the rail comprising:
an outer wall that extends in a vertical direction and defines an extent of the ramp in a width dimension;
a curb comprising an inner wall connected to the outer wall at a curb head that forms a vertical extent of the rail, wherein the inner wall is angled away from the outer wall in a direction away from the curb head at an angle of ten degrees or less;
a side wall oriented parallel to the outer wall and a lower end of the side wall is connected to a lower end of the outer wall by a bottom wall;
a shelf connected to an upper end of the side wall and a lower end of the inner wall; and
a shelf extension is connected to the lower end of the inner wall and to the outer wall, wherein the shelf extension is co-planar with the shelf and the shelf extension is perpendicular to the outer wall; and
a deck secured to the shelf, the deck configured to support a wheel of a vehicle, the curb vertically extending above the deck;
wherein the curb head forms an arch between the outer wall and the inner wall, the arch having a diameter at least four times a thickness of the outer wall or the inner wall.

3. The ramps system of claim 2, wherein the curb head is solid through a distance in the vertical direction at least four times a thickness of the outer wall or the inner wall.

4. The ramp system of claim 2, wherein a vertical extent of an upper portion of the outer wall from the shelf extension to the curb head is greater than half of the vertical extent of the outer wall.

5. The ramp system of claim 2, wherein the shelf and the shelf extension are equal widths in a horizontal dimension.

6. The ramp system of claim 2, wherein the shelf extension is perpendicular to the side wall.

7. The ramp system of claim 2, further comprising a plurality of reflectors arranged along the outer wall of the rail.

8. The ramp system of claim 7, wherein the reflectors are arranged along a center line of the outer wall of the rail.

9. The ramp system of claim 7, wherein the reflectors are arranged to indicate the position of the deck relative to rail.

10. The ramp system of claim 2, wherein the rail is a first rail and the curb of the first rail is a first curb, and further comprising a second rail with a second curb and a second shelf wherein the deck is secured to the second shelf and the first rail defines an outer extent of a first side of the ramp system and the second rail defines an outer extent of a second side of the ramp system.

11. The ramp system of claim 2, further comprising a beam oriented along a major length of the ramp system, wherein the deck is further secured to the beam.

12. The ramp system of claim 11, wherein the beam is a first beam, the rail is a first rail, and the deck is a first deck and further comprising:
a second beam;
a second rail comprising:
an outer wall that defines an extent of the ramp in the width dimension;
an inner wall connected to the outer wall at a curb head, the inner wall extending away from the curb head at an angle relative to the outer wall;
a side wall oriented parallel to the outer wall and a lower end of the side wall connected to a lower end of the outer wall by a bottom wall;
a shelf connected between an upper end of the side wall and a lower end of the inner wall; and
a shelf extension connected between the lower end of the inner wall and the outer wall; and
a second deck secured to the shelf of the second rail and to the second beam the deck configured to support a wheel of the vehicle.

13. The ramp system of claim 12 wherein the first rail is oriented in parallel to the second rail and the first deck is adjacent to the second deck in the width dimension of the ramp system.

14. The ramp system of claim 12 further comprising a ramp stand wherein the first rail and the second rail are connected to the ramp stand and the first deck is adjacent to the second deck in a length dimension of the ramp system.

15. The ramp system of claim 2, further comprising:
a foot pad comprising a deck plate and a base plate wherein the base plate is longer in a length dimension than the deck plate and the deck plate is oriented at an angle relative to the base plate, the foot pad comprising a channel; and
a ramp hook secured to the rail and to the beam, the ramp hook configured to be movably and removably secured in the channel.

16. The ramp system of claim 2, wherein the foot pad further comprises:
a plurality of internal support members that are oriented perpendicular to the deck plate and extend between the deck plate and the base plate; and
a foot pad end plate connected between the base plate and the channel;
wherein the foot pad end plate is oriented at an obtuse angle to the deck plate and the deck plate is oriented at an acute angle relative to the base plate.

* * * * *